United States Patent
Wada

(10) Patent No.: US 8,683,427 B2
(45) Date of Patent: Mar. 25, 2014

(54) INFORMATION PROCESSING APPARATUS, CONTROL METHOD THEREOF, AND COMPUTER READABLE STORAGE MEDIUM FOR SUPPORTING TEST PROCESSES FOR RESPECTIVE SOFTWARE COMPONENTS

(75) Inventor: Asuka Wada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 13/108,153

(22) Filed: May 16, 2011

(65) Prior Publication Data

US 2011/0302552 A1 Dec. 8, 2011

(30) Foreign Application Priority Data

Jun. 3, 2010 (JP) ................................. 2010-128272

(51) Int. Cl.
*G06F 9/44* (2006.01)
(52) U.S. Cl.
USPC .......................................... 717/106; 717/107
(58) Field of Classification Search
None
See application file for complete search history.

(56) References Cited

U.S. PATENT DOCUMENTS

| 6,182,245 B1 * | 1/2001 | Akin et al. ................. 714/38.14 |
| 2005/0086565 A1 * | 4/2005 | Thompson et al. ........... 714/741 |
| 2006/0075302 A1 * | 4/2006 | Ulrich et al. .................... 714/38 |

FOREIGN PATENT DOCUMENTS

JP 2005-242751 A 9/2005

* cited by examiner

*Primary Examiner* — Don Wong
*Assistant Examiner* — Deric Ortiz
(74) *Attorney, Agent, or Firm* — Fitzpatrick, Cella, Harper & Scinto

(57) ABSTRACT

Modeled test cases are created by converting test cases of each component, which describe interface call orders for the component, into expressions with a level of abstraction increased by excluding component unique information included in the test cases using classification information of interfaces provided by the component. Modeled test cases as differences are extracted by comparing the modeled test cases between a plurality of components.

14 Claims, 12 Drawing Sheets

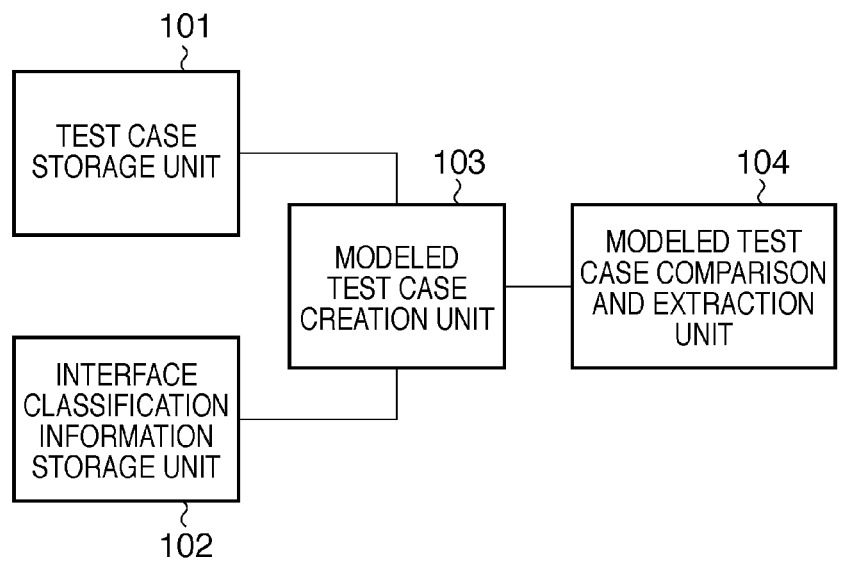
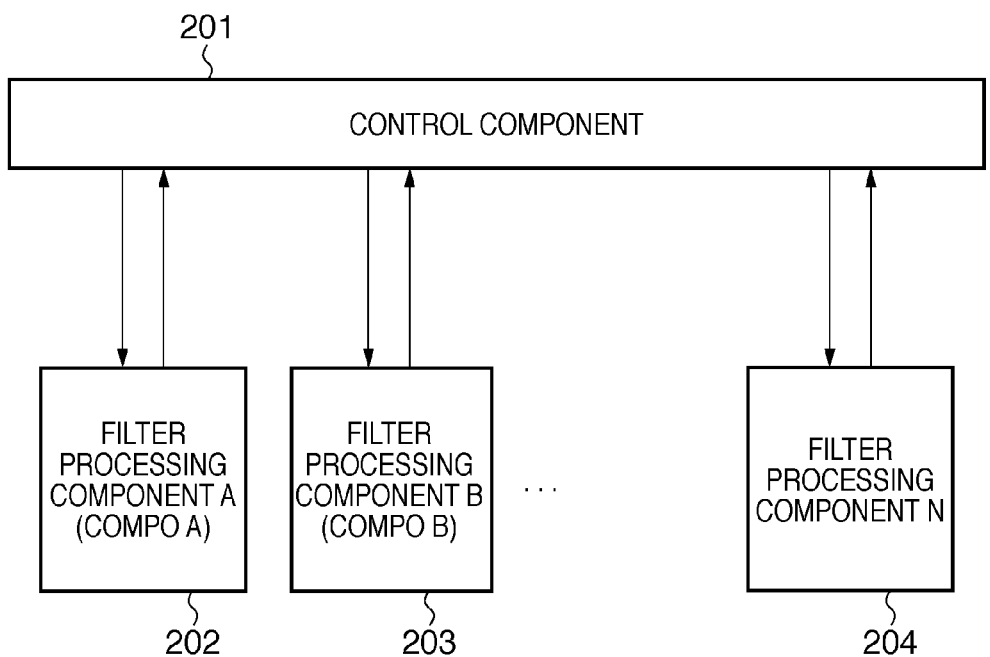

FIG. 3

```
TestCaseA1(){
    ...
    result = compoAOpen();            }~302
        assertCheck(result == OK);
    result = compoAStart(paramA1);    }~303
        assertCheck(result == OK);
    result = compoAStop();
        assertCheck(result == OK);
    result = compoAClose();
        assertCheck(result == OK);
    ...
}
```

| COMPO-A INTERFACE DEFINITION | INTERFACE CLASSIFICATION INFORMATION | |
|---|---|---|
| 403 — compoAOpen() | 1 | (PRE-PROCESSING) |
| 404 — compoAClose() | 2 | (POST-PROCESSING) |
| 405 — compoAStart(paramA1) | 3 | (PROCESSING START) |
|  | 5 | (PARAMETER SETTING) |
| 406 — compoAStop() | 4 | (PROCESSING STOP) |

401  402

| COMPO-B INTERFACE DEFINITION | | INTERFACE CLASSIFICATION INFORMATION |
|---|---|---|
| 703 ~ compoBInitialize() | 1 | (PRE-PROCESSING) |
| 704 ~ compoBFinalize() | 2 | (POST-PROCESSING) |
| 705 ~ compoBDecode() | 3 | (PROCESSING START) |
| 706 ~ compoBDecodeStop() | 4 | (PROCESSING STOP) |
| 707 ~ compoBSetMode(paramB1) | 5 | (PARAMETER SETTING) |

701 / 702

801

```
AbstTestCaseB2{
  . . .
    1,5,3,4,2,
  . . .
}
```

F I G. 12
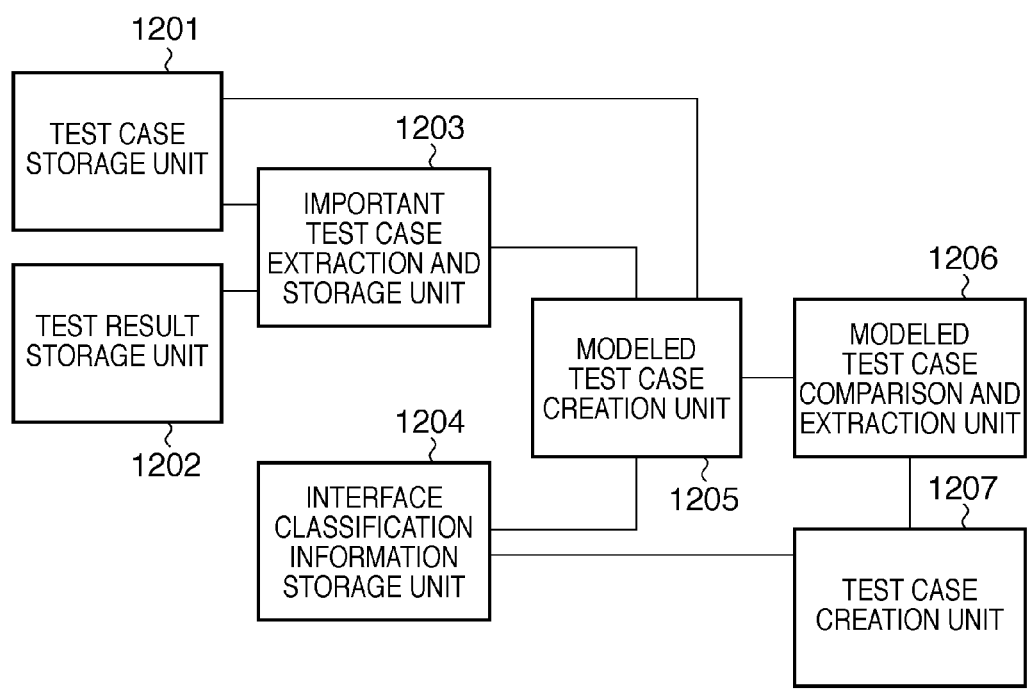

INFORMATION PROCESSING APPARATUS, CONTROL METHOD THEREOF, AND COMPUTER READABLE STORAGE MEDIUM FOR SUPPORTING TEST PROCESSES FOR RESPECTIVE SOFTWARE COMPONENTS

BACKGROUND OF THE INVENTION

1. Field of the Invention

The present invention relates to an information processing system which builds software by combining a plurality of software components and, more particularly, to a component test supporting technique which supports test processes for respective software components.

2. Description of the Related Art

Upon development of recent large-scale software systems, a method of developing one system by dividing it into a plurality of software components (to be simply referred to as components hereinafter) each having unique unit function is often adopted. As one method of dividing the functions of the overall system into components, a method of storing division know-how upon previous patterns built up as systems, and applying the stored patterns upon developing a new similar system is known.

For example, in a division method called Pipes & Filters patterns, processing which applies arbitrary conversion to input data, and outputs the converted data (this processing will be referred to as filter processing hereinafter) is considered as a unit function, and a system is divided into components along the flows of data. This division method allows to switch and expand functions to be implemented by a system by exchanging filter processing components and changing their combinations, and is applied to many scenes such as a video stream processing system. Also, a method of dividing functions which are more likely to be changed as individual components under the assumption of future functional expansion without applying a specific division pattern to the entire system is known. Conversely, a method of dividing functions which can be commonly used in a plurality of systems as components is available.

In this case, systems which are divided by any of these methods normally include similar component groups which implement identical processing flows having different functions. In a system to which the aforementioned Pipes & Filters patterns are applied, a filter processing component group corresponds to this similar component group.

On the other hand, in order to assure the quality of a system configured by a plurality of components, tests having a plurality of granularities are repetitively conducted in general. For example, tests are conducted by broadening a range step by step like a unit test conducted for each component, a combined test conducted for a combination of a plurality of components, and a system test conducted by integrating the entire system. In this case, for example, when individual components have low qualities as a result of insufficient execution of unit tests, such low qualities are spread to the entire system to drop the quality of the entire system. In order to efficiently conduct tests of respective granularities and to assure the quality of the system, a method of enhancing traceability of test cases, and feeding back combined test results to unit tests is available (Japanese Patent Laid-Open No. 2005-242751).

Upon examining unit tests of a component, a call order of functions (to be referred to as interfaces hereinafter) which are provided by a certain component to another component includes infinite combinations in consideration of redundant calls. Also, combinations of values to be substituted in arguments of respective interfaces are huge, and it is difficult to conduct unit tests of a component for all combinations.

Hence, in general, unit tests are conducted while focusing on test cases in which important test case bugs are expected to be found. For example, as for the interface call order, unit tests are conducted while focusing on a normal scenario and typical abnormal scenario. As for arguments, for example, only combinations of two variables are covered, and infinite parameter values are replaced by finite values using, for example, equivalence partitioning and boundary-value analysis, thereby conducting efficient and effective tests. However, test case focusing processes by these methods largely depend on past experiences and personal skills for a target system, thus causing test errors.

In this case, between similar components such as the filter processing component group which configures the aforementioned Pipes & Filters patterns, if a bug was found in a certain component A, a similar bug is more likely to be included in another component B. In such case, a developer/tester of the component A informs a developer/tester of the component B of bug contents, and it can be confirmed if a similar bug has occurred in the component B. More specifically, the developer/tester of the component B confirms if a test similar to that which found the bug in the component A has already been conducted for the component B. If such test has not been conducted yet, a test case is added to preclude the possibility of the bug.

However, in case of a system configured by many similar components, there are many combinations of similar components, and mutual confirmation processes depending on inter-developer/tester communications have limitations. As a result, components have quality differences, resulting in a quality drop of the entire system.

SUMMARY OF THE INVENTION

The present invention improves the qualities of individual components and the entire system in an information processing system in which a plurality of components cooperate.

According to the first aspect of the present invention, an information processing apparatus, which supports, in one system implemented by cooperating components being as a plurality of software components, tests of the components, the apparatus comprises: a test case storage unit which stores test cases of components, which describe interface call orders for the components; an interface classification information storage unit which stores pieces of classification information of interfaces provided by the components; a modeled test case creation unit which creates modeled test cases by converting test cases of each component stored in the test case storage unit into expressions with a level of abstraction increased by excluding component unique information included in the test cases using the interface classification information stored in the interface classification information storage unit; and a modeled test case comparison and extraction unit which extracts modeled test cases as differences by comparing modeled test cases created by the modeled test case creation unit between a plurality of components.

According to the second aspect of the present invention, an information processing apparatus, which supports, in one system implemented by cooperating components being as a plurality of software components, tests of the components, the apparatus comprises: a test case storage unit which stores test case of components, which describe interface call orders for the components; a test result storage unit which stores test results of test cases of components stored in the test case storage unit; an important test case extraction and storage unit which extracts and stores important test cases as test cases in which bugs were found from test cases of components stored in the test case storage unit using the test results stored in the test result storage unit; an interface classification information storage unit which stores pieces of classification information of interfaces provided by the components; a modeled test case creation unit which creates modeled test cases by converting test cases of each component stored in the test case storage unit or important test cases stored in the important test case extraction and storage unit into expressions with a level of abstraction increased by excluding component unique information included in the test case of the component using the interface classification information stored in the interface classification information storage unit; a modeled test case comparison and extraction unit which extracts modeled test cases as differences by comparing modeled test cases created by the modeled test case creation unit between a plurality of components; and a test case creation unit which creates test cases by appending the component unique information to the modeled test cases extracted by the modeled test case comparison and extraction unit using the interface classification information stored in the interface classification information storage unit.

According to the third aspect of the present invention, a control method of an information processing apparatus, which supports, in one system implemented by cooperating components being as a plurality of software components, tests of the components, the method comprises: a creation step of controlling a modeled test case creation unit to create modeled test cases by converting test cases of each component, which describe interface call orders for the component, into expressions with a level of abstraction increased by excluding component unique information included in the test cases using classification information of interfaces provided by the component; and an extraction step of controlling a modeled test case comparison and extraction unit to extract modeled test cases as differences by comparing the modeled test cases created in the creation step between a plurality of components.

According to the fourth aspect of the present invention, a control method of an information processing apparatus, which supports, in one system implemented by cooperating components as a plurality of software components, tests of the components, the method comprises: an extraction step of controlling an extraction unit to extract important test cases as test cases in which bugs were found from test cases of each component, which describe interface call orders for the component, using test results of the test cases; a creation step of controlling a creation unit to extract modeled test cases by converting the test cases or the important test cases of the component into expressions with a level of abstraction increased by excluding component unique information included in the test case using classification information of interfaces provided by the component; a modeled test case comparison and extraction step of controlling a modeled test case comparison and extraction unit to extract modeled test cases as differences by comparing the modeled test cases created in the creation step between a plurality of components; and a test case creation step of controlling a test case creation unit to create test cases by appending the component unique information to the modeled test cases extracted in the modeled test case comparison and extraction step using the classification information of interfaces.

According to the fifth aspect of the present invention, a computer readable storage medium storing program for causing a computer to control an information processing apparatus, which supports, in one system implemented by cooperating components as a plurality of software components, tests of the components, the program causes the computer to execute: a creation step of creating modeled test cases by converting test cases of each component, which describe interface call orders for the component, into expressions with a level of abstraction increased by excluding component unique information included in the test cases using classification information of interfaces provided by the component; and an extraction step of extracting modeled test cases as differences by comparing the modeled test cases created in the creation step between a plurality of components.

According to the sixth aspect of the present invention, a computer readable storage medium storing program for causing a computer to control an information processing apparatus, which supports, in one system implemented by cooperating components as a plurality of software components, tests of the components, the program causes the computer to execute: an extraction step of extracting important test cases as test cases in which bugs were found from test cases of each component, which describe interface call orders for the component, using test results of the test cases; a creation step of creating modeled test cases by converting the test cases or the important test cases of the component into expressions with a level of abstraction increased by excluding component unique information included in the test cases using classification information of interfaces provided by the component; a modeled test case comparison and extraction step of extracting modeled test cases as differences by comparing the modeled test cases created in the creation step between a plurality of components; and a test case creation step of creating test cases by appending the component unique information to the modeled test cases extracted in the modeled test case comparison and extraction step using the classification information of interfaces.

According to the present invention, the qualities of individual components and the entire system can be improved in an information processing system in which a plurality of components cooperate. More specifically, test cases of another similar component are added based on test cases used in unit tests of a certain component, thereby improving the qualities of individual components and the entire system.

Further features of the present invention will become apparent from the following description of exemplary embodiments (with reference to the attached drawings).

BRIEF DESCRIPTION OF THE DRAWINGS

FIG. 1 is a block diagram showing the arrangement of a test supporting system according to the first embodiment;

FIG. 2 is a diagram showing an example of a software system to which the present invention is applied;

FIG. 3 is a view showing an example of a compo-A test case group according to the first embodiment;

FIG. 4 is a table showing an example of compo-A interface classification information according to the first embodiment;

FIG. 12 is a block diagram showing the arrangement of a test supporting system according to the second embodiment;

DESCRIPTION OF THE EMBODIMENTS

Figure 5:
FIG. 5 is a view showing an example of a compo-A modeled test case group according to the first embodiment.

A embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

<Overview of Invention>

The present invention is directed to an information processing technique which implements one system by cooperating components being as a plurality of software components. Especially, based on test scenarios used in unit tests conducted for each individual component and the test results, test scenarios of another similar component are added, thereby improving the qualities of individual components and the entire system.

For example, assume that there are a video decode component (component A) and an image quality enhancement component (component B), each of which provides filter processing of a stream. In this case, assume that in a unit test for the component A, a bug was found in a test case having a sequence:

1. stream processing start;
2. stream processing stop; and
3. stream parameter setting.

In this case, a plurality of test cases having similar sequences are added for the component B.

In this way, by automatically adding test cases similar to the test case, in which a bug was found in the component A, to the component B, the following effects can be obtained:

the qualities of respective components can be mutually improved; and the quality of the system is improved.

The present invention is similarly applicable to a software system which adopts another architecture pattern. For example, in a Model-View-Controller pattern which is adopted in many interactive applications, a unit system includes a plurality of View components. Hence, by applying the present invention to these View components, qualities between components can be mutually improved.

Embodiments of the present invention will be described in detail hereinafter with reference to the drawings. However, the technical scope of the present invention is not limited by these embodiments.

<First Embodiment>

FIG. 1 is a block diagram showing the arrangement of a component test supporting system according to the first embodiment.

Reference numeral 101 denotes a test case storage unit, which stores test cases of unit tests conducted for respective components. In this case, a test case indicates an object which describes an interface call order for a component to be tested by an arbitrary method.

More specifically, the test case may be, for example, a source code described using a programming language, a description using XML, or a description on a specific test tool. Also, the test case is defined to have independent items as many as the number of events to be tested, and a plurality of test cases (to be simply referred to as a test case group hereinafter) are defined for one component. A test case group to be stored may be stored in advance in a memory unit in the test case storage unit 101. Alternatively, the test case storage unit 101 may include an input unit, and inputs from the user may be stored in the memory unit as needed. As the input unit, various kinds of operation equipment such as a keyboard, mouse, digitizer, touch panel, and joystick are assumed. However, the first embodiment does not specify the arrangement or the presence/absence of these input units.

Reference numeral 102 denotes an interface classification information storage unit, which stores interface classification information. The interface classification information is commonly used between a plurality of components, and one or a plurality of pieces of classification information are assigned to one interface. The interface classification information to be stored may be stored in advance in a memory unit in the interface classification information storage unit 102. Alternatively, the interface classification information storage unit 102 may include an input unit, and inputs from the user may be stored in the memory unit as needed. As the input unit, various kinds of operation equipment are assumed as in the input unit in the test case storage unit 101. However, the first embodiment does not specify the arrangement or the presence/absence of these input units. Also, the input unit in the test case storage unit 101 and that in the interface classification information storage unit 102 may be commonly used on the hardware arrangement.

Reference numeral 103 denotes a modeled test case creation unit. The modeled test case creation unit 103 creates modeled test cases by converting a test case group of a component stored in the test case storage unit 101 using interface classification information stored in the interface classification information storage unit 102.

Reference numeral 104 denotes a modeled test case comparison and extraction unit. The modeled test case comparison and extraction unit 104 compares modeled test case groups created by the modeled test case creation unit 103 between a plurality of components, and extracts differences, that is, modeled test cases defined only for one component.

Note that the hardware arrangement which implements the system shown in FIG. 1 can be implemented by a general-purpose computer (information processing apparatus). The hardware arrangement has standard elements (for example, a CPU, RAM, ROM, hard disk, external storage device, network interface, display, keyboard, and mouse) included in this general-purpose computer.

FIG. 2 is a diagram showing an example of the structure of an information processing system according to the first embodiment. This system assumes a processing system which repeats various types of filter processing such as Demux (demultiplexer) processing, decode processing, and image quality enhancement processing to an input stream to convert it into an output stream like, for example, a video stream processing system.

A control component 201 advances the processing sequence of the entire system while repeating interactions with a plurality of filter processing components 202 to 204.

The filter processing components 202 to 204 respectively assume various types of filter processing for an input stream. In this case, the filter processing components 202 to 204 have similar configurations such as allocations in the system, relationships with other components, and interaction procedures with the control component 201 although they provide different functions with respect to the system. For this reason, even when each filter processing component individually conducts a unit test, test cases included in the unit test have similar configurations. Taking, as an example, the filter processing component 202 (to be simply referred to as compo A hereinafter) and filter processing component 203 (to be simply referred to as compo B hereinafter), the following description will be continued while assuming a scene in which some of test cases defined for compo A are applied to compo B.

FIG. 3 is a view showing an example of a compo-A test case group stored in the test case storage unit 101 of the first embodiment.

In a test case 301, TestCaseA1( ) is defined as one of basic test cases of compo A, and includes descriptions assumed to check return values of respective interfaces with their expected values.

A row 302 describes a call of an interface compoAOpen( ) defined for compo A. A row 303 describes a call of an interface compoAStart( ) together with an argument paramA1.

FIG. 4 shows an example of compo-A interface classification information stored in the interface classification information storage unit 102 of the first embodiment.

A column 401 shows compo-A interface definitions, and shows a list of interfaces disclosed by compo A to external components. For example, when compo A is used in the information processing system shown in FIG. 2, the control component 201 calls the interfaces shown in the column 401, thereby advancing processing in the system.

A column 402 shows interface classification information corresponding to each row of the compo-A interface definitions shown in the column 401. In this example, each interface classification information is expressed by an interface classification number (1 to 5) and an additional explanation which complements the interface classification number. This additional explanation includes at least one of pre-processing, post-processing, processing start, processing stop, and parameter setting in FIG. 4.

Rows 403 to 406 show associations between the compo-A interface definitions and pieces of interface classification information. The row 403 indicates that the interface compoAOpen( ) defined for compo A is classified as an interface classification number=1. The row 404 indicates that an interface compoAClose( ) defined for compo A is classified as an interface classification number=2.

The row 405 indicates that an interface compoAStart( ) defined for compo A is classified as interface classification numbers=3 and 5. In this case, the interface compoAStart( ) sets a parameter paramA1 in a call of that interface. As for such interface, a parameter setting and a call of an interface body are separately considered. That is, interface classification information is assigned by replacing interfaces by a sequence in which after the parameter setting is executed, the interface body is called.

The row 406 indicates that an interface compoAStop( ) defined for compo A is classified as an interface classification number=4.

FIG. 5 is a view showing a modeled test case group associated with compo A created by the modeled test case creation unit 103 of the first embodiment.

An example of a modeled test 501 is a conversion result obtained by applying the interface classification information 402 to the test case 301. In this case, conversion from a test case into a modeled test case indicates a process for replacing the test case by an expression with a level of abstraction increased by excluding component unique information (interface names and interface configuration) included in the test case.

Figure 6:
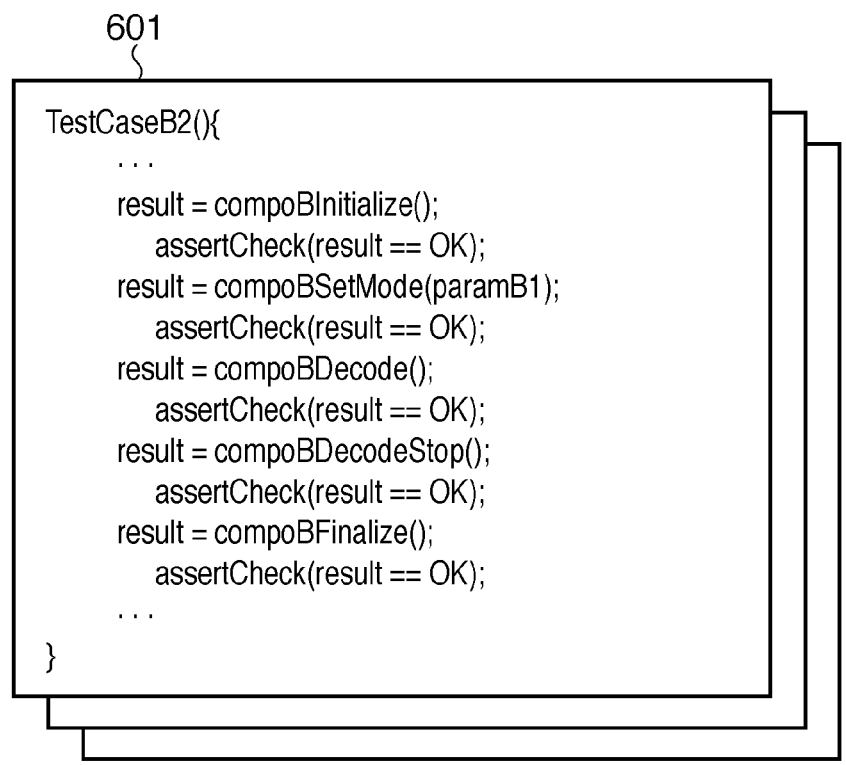
FIG. 6 is a view showing an example of a compo-B test case group according to the first embodiment.

FIG. 6 is a view showing an example of a compo-B test case group stored in the test case storage unit 101 of the first embodiment.

In a test case 601, TestCaseB2( ) is defined as one of basic test cases of compo B, and includes descriptions assumed to check return values of respective interfaces with their expected values.

Figures 7, 8:
FIG. 7 is a table showing an example of compo-B interface classification information according to the first embodiment.
FIG. 8 is a view showing an example of a compo-B modeled test case group according to the first embodiment.

FIG. 7 shows an example of compo-B interface classification information stored in the interface classification information storage unit 102 of the first embodiment.

A column 701 shows compo-B interface definitions, and shows a list of interfaces disclosed by compo B to external components.

A column 702 shows interface classification information corresponding to each row of the compo-B interface definitions shown in the column 701. In this case, as the interface classification information 402 to be applied to compo A described above and the interface classification information 702 to be applied to compo B, the same classification information has to be used.

Each of rows 703 to 707 shows an association between the interface definition and interface information of compo B. The row 703 indicates that an interface compoBInitialize( ) defined for compo B is classified as an interface classification number=1. In the rows 704 to 706 as well, corresponding interface classification numbers are associated with the interface definitions defined in the respective rows.

FIG. 8 is a view showing a modeled test case group associated with compo B created by the modeled test case creation unit 103 of the first embodiment.

An example of a modeled test case 801 is a conversion example obtained by applying the interface classification information 702 to the test case 601.

Figure 9:
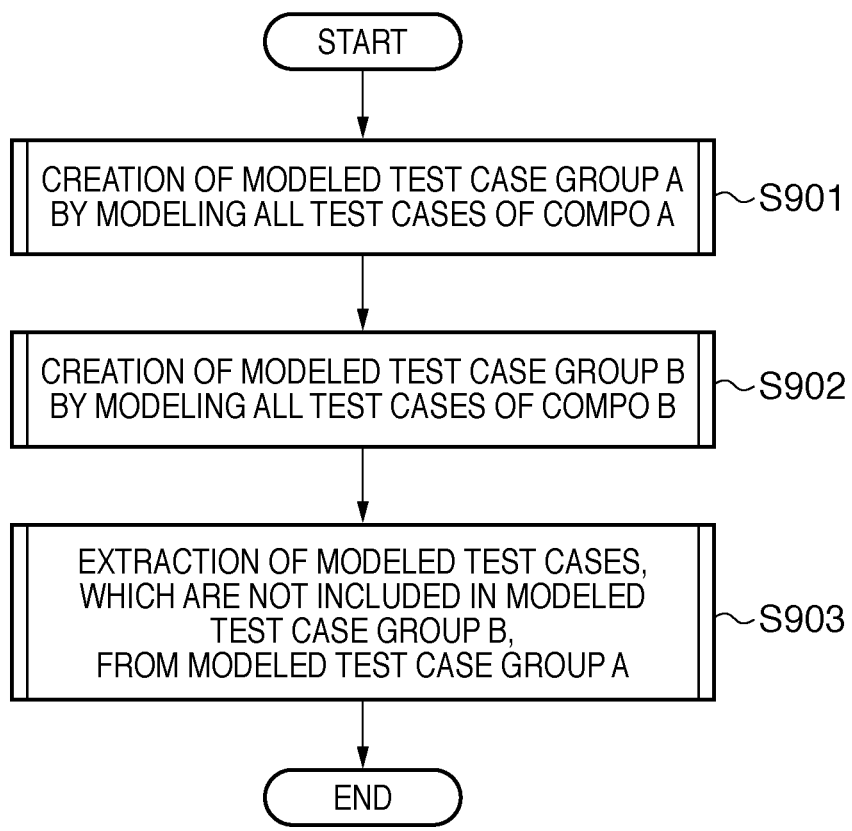
FIG. 9 is a flowchart of a test supporting sequence according to the first embodiment.

FIG. 9 is a flowchart of the component test supporting sequence of the first embodiment. The following description will be given along this flowchart while quoting the practical examples shown in FIGS. 2 to 8.

In step S901, the modeled test case creation unit 103 converts a compo-A test case group stored in the test case storage unit 101 using compo-A interface classification information stored in the interface classification storage unit 102. Thus, the modeled test case creation unit 103 creates a modeled test case group A.

In step S902, the modeled test case creation unit 103 converts a compo-B test case group stored in the test case storage unit 101 using compo-B interface classification information stored in the interface classification storage unit 102. Thus, the modeled test case creation unit 103 creates a modeled test case group B.

In step S903, the modeled test case comparison and extraction unit 104 extracts modeled test cases, which are not included in the modeled test case group B created in step S902, from the modeled test case group A created in step S901.

Figure 10:
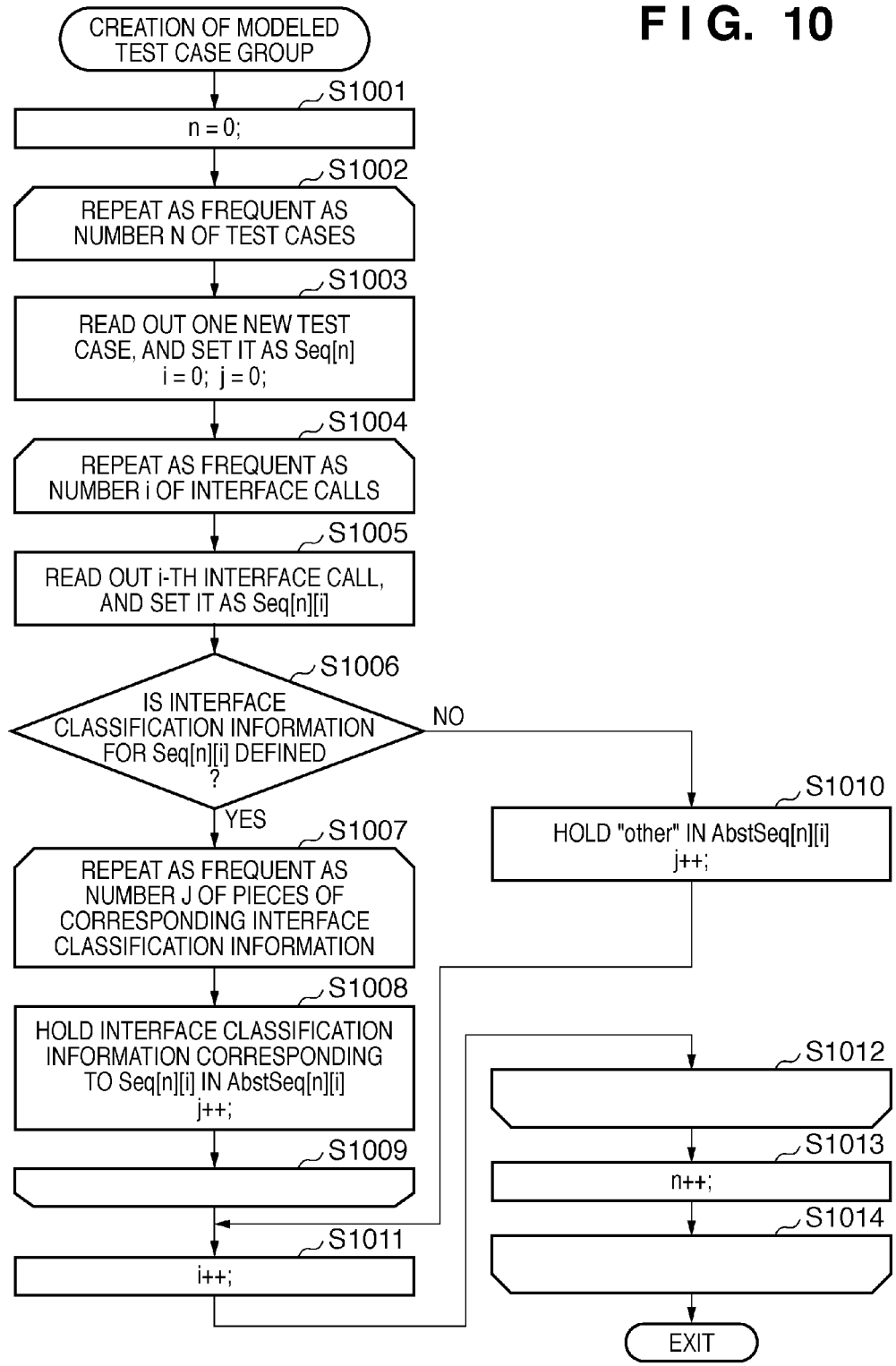
FIG. 10 is a flowchart of a modeled test case group creation sequence according to the first embodiment.

FIG. 10 is a flowchart showing details of the modeled test case group creation sequence by the modeled test case creation unit 103 of the first embodiment. FIG. 10 corresponds to steps S901 and S902 in FIG. 9. To steps S901 and S902, the same processing is applicable, but these two processes have different test case groups and interface classification information to be input to these processes. The following description will be given under the assumption that step S901 is executed, that is, the processing is applied to compo A. Upon execution of the compo-A processing, the test case group exemplified in FIG. 3 and the interface classification information exemplified in FIG. 4 are input.

In step S1001, the modeled test case creation unit 103 sets "0" in a variable n as initialization processing (n=0).

In step S1002, the modeled test case creation unit 103 repeats subsequent processes in steps S1003 to S1014 as frequent as the number N of compo-A test cases stored in the test case storage unit 101.

In step S1003, the modeled test case creation unit 103 reads out one new test case from the compo-A test cases stored in the test case storage unit 101, and sets it as Seq[n]. At the same time, the modeled test case creation unit 103 sets "0" in variables i and j as initialization processing. The following processing will be described under the assumption that the test case 301 is read out in the practical example of compo A.

In step S1004, the modeled test case creation unit 103 repeats subsequent processes in steps S1005 to S1012 as frequent as the number I of interface calls defined in Seq[n].

In step S1005, the modeled test case creation unit 103 reads out one interface call in turn from the head of Seq[n], and sets it as Seq[n][i]. The following processing will be described under the assumption that the interface call 303 is read out in the practical example of compo A.

The modeled test case creation unit 103 determines in step S1006 whether or not the interface call read out in step S1005 is defined in interface classification information. If it is determined that the readout interface call is defined in the interface classification information (YES in step S1006), the process advances to step S1007. On the other hand, if it is determined that the readout interface call is not defined in the interface classification information (NO in step S1006), the process advances to step S1010. In the aforementioned practical example, since the corresponding interface classification information is defined in the row 405, the process advances to step S1007.

In step S1007, the modeled test case creation unit 103 repeats a process of step S1008 as frequent as the number of pieces of interface classification information defined in the corresponding interface classification information. In the practical example of compo A, since two pieces of interface classification information are defined in the row 405, the number of times of repetition is "2".

In step S1008, the modeled test case creation unit 103 holds the interface classification information corresponding to the interface call read out in step S1005 in AbstSeq[n][j]. The modeled test case creation unit 103 increments the variable j.

If the interface call is not defined in the interface classification information in step S1010, the modeled test case creation unit 103 holds "other" indicating that there is no corresponding interface classification information in AbstSeq[n][j]. The modeled test case creation unit 103 increments the variable j. However, this step S1010 may be omitted, or the processing contents may be changed. In either case, the processing contents of step S1010 may have consistency during an execution period of the first embodiment.

In step S1011, the modeled test case creation unit 103 increments the variable i. In step S1013, the modeled test case creation unit 103 increments the variable n.

As described above, as the execution result of the processes in steps S1001 to S1014, in the example of compo A, a modeled test case group including the modeled test case 501 is held in the modeled test case creation unit 103.

By applying the processing in FIG. 9 to compo B, in the example of compo B, a modeled test case group including the modeled test case 801 is held in the modeled test case creation unit 103.

Figure 11:
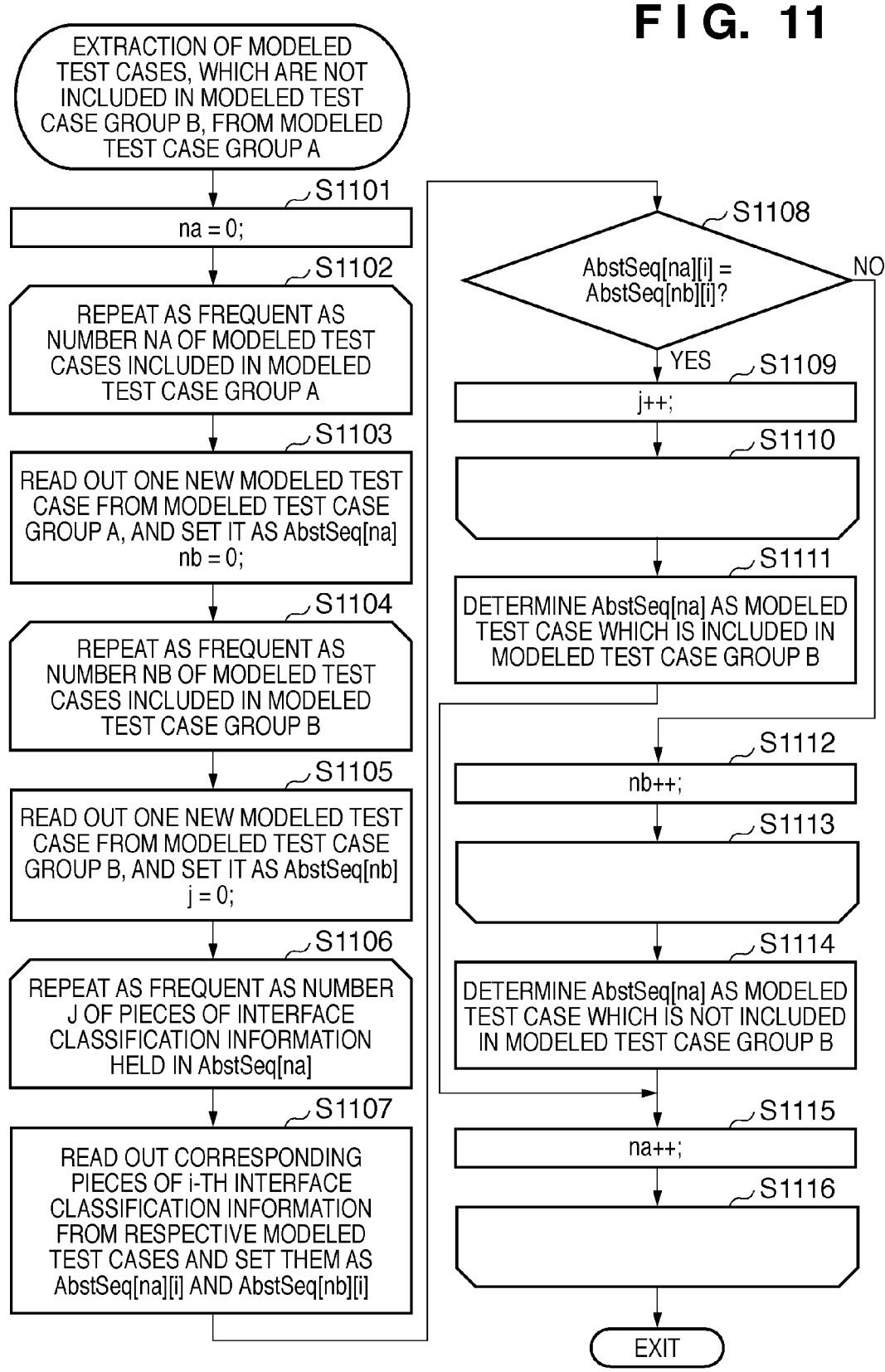
FIG. 11 is a flowchart of a modeled test case group extraction sequence according to the first embodiment.

FIG. 11 is a flowchart showing details of the comparison sequence of the compo-A and compo-B modeled test case groups held in the modeled test case creation unit 103 of the first embodiment. FIG. 11 corresponds to step S903 in FIG. 9. The following processing will be explained under the assumption that the modeled test case group (FIG. 5) associated with compo A and that (FIG. 8) associated with compo B are held in the modeled test case creation unit 103.

In step S1101, the modeled test case comparison and extraction unit 104 sets "0" in a variable na as initialization processing (na=0).

In step S1102, the modeled test case comparison and extraction unit 104 repeats subsequent processes in steps S1103 to S1116 as frequent as the number NA of compo-A modeled test cases stored in the modeled test case creation unit 103.

In step S1103, the modeled test case comparison and extraction unit 104 reads out one new compo-A modeled test case from the modeled test case creation unit 103, and sets it as AbstSeq[na]. At the same time, the modeled test case comparison and extraction unit 104 sets "0" in a variable nb as initialization processing (nb=0). The following processing will be described under the assumption that the modeled test case 501 is read out in the aforementioned practical example.

In step S1104, the modeled test case comparison and extraction unit 104 repeats subsequent processes in steps S1105 to S1113 as frequent as the number NB of compo-B modeled test cases stored in the modeled test case creation unit 103.

In step S1105, the modeled test case comparison and extraction unit 104 reads out one new compo-B modeled test case from the modeled test case creation unit 103, and sets it as AbstSeq[nb]. At the same time, the modeled test case comparison and extraction unit 104 sets "0" in a variable j as initialization processing (j=0). The following processing will be explained under the assumption that the modeled test case 801 is read out in the aforementioned practical example.

In step S1106, the modeled test case comparison and extraction unit 104 repeats subsequent processes in steps S1107 to S1110 as frequent as the number J of pieces of interface classification information held in AbstSeq[na]. In the aforementioned practical example, since the modeled test case 501 holds five pieces of interface classification information, the number of times of repetition is "5".

In step S1107, the modeled test case comparison and extraction unit 104 reads out corresponding pieces of interface classification information in turn from AbstSeq[na] and AbstSeq[nb], respectively, and sets them as AbstSeq[na][i] and AbstSeq[nb][i].

The modeled test case comparison and extraction unit 104 determines in step S1108 whether or not the two pieces of interface classification information associated with compo A and compo B, which are read out in step S1107, are equal to each other. If it is determined that the two pieces of interface classification information are equal to each other (YES in step S1108), the process advances to step S1109. On the other hand, if it is determined that the two pieces of interface classification information are not equal to each other, that is, they are different from each other (NO in step S1108), the process jumps to step S1112. In the above practical example, since both the pieces of interface classification information read out first are '1', the process advances to step S1109.

In step S1109, the modeled test case comparison and extraction unit 104 increments the variable j.

The control reaches step S1111 when sequences of pieces of interface classification information in AbstSeq[na] and AbstSeq[nb] perfectly match. For this reason, the modeled test case comparison and extraction unit 104 determines that AbstSeq[na] is a modeled test case included in the modeled test case group B. In the above practical example, since the sequences of pieces of interface classification information in the compo-A modeled test case 501 and compo-B modeled test case 801 perfectly match, the control reaches step S1111, and it is determined that AbstSeq[na] is included in the modeled test case group B.

The control reaches step S1112 when sequences of pieces of interface classification information in AbstSeq[na] and AbstSeq[nb] are different from each other. For this reason, the modeled test case comparison and extraction unit 104 increments nb to read out the next modeled test case from compo B, thus preparing for the next comparison processing.

The control reaches step S1114 when AbstSeq[na] does not match all modeled test cases for compo B. For this reason, the modeled test case comparison and extraction unit 104 determines that AbstSeq[na] is a modeled test case which is not included in the modeled test case group B.

In step S1115, the modeled test case comparison and extraction unit 104 increments the variable na.

As described above, as the execution result of the processes in steps S1101 to S1116, modeled test cases, which are not included in the modeled test case group B, are extracted from the modeled test case group A. In steps S1101 to S1116, the defined modeled test case is determined only when the sequences of pieces of interface classification information match. However, the present invention is not limited to this. For example, the defined modeled test case may be determined even when only some pieces of information of modeled test cases match. Alternatively, a similar modeled test case may be determined when some pieces of modeled test cases match.

As described above, according to the first embodiment, test cases respectively defined for similar compo A and compo B are converted into modeled test cases to be compared, thus allowing to extract modeled test cases defined only for compo A.

The first embodiment has explained details of the processing taking, as an example, the filter processing components that configure the information processing system shown in FIG. 2. However, this embodiment is applicable to information processing systems of other configurations, and does not limit information processing systems by their configurations.

<Second Embodiment>

The second embodiment of the present invention will be described below while focusing on differences from the first embodiment. However, the technical scope of the present invention is not limited by this embodiment.

FIG. 12 is a block diagram showing the arrangement of a component test supporting system according to the second embodiment.

Reference numeral 1201 denotes a test case storage unit, which stores test cases of unit tests executed for respective components as in the test case storage unit 101 of the first embodiment. Reference numeral 1202 denotes a test result storage unit, which stores test results obtained by actually operating the test cases stored in the test case storage unit 1201. Reference numeral 1203 denotes an important test case extraction and storage unit, which selects and stores important test cases from the test case storage unit 1201 based on the test results stored in the test result storage unit 1202.

Reference numeral 1204 denotes an interface classification information storage unit, which stores interface classification information as in the interface classification information storage unit 102 of the first embodiment. Reference numeral 1205 denotes a modeled test case creation unit. The modeled test case creation unit 1205 creates a modeled test case by converting a stored test case of a component using interface classification information stored in the interface classification information storage unit 1204. In this case, the stored test case of the component is that stored in the test case storage unit 1201 or important text case extraction and storage unit 1203.

Reference numeral 1206 denotes a modeled test case comparison and extraction unit, which compares modeled test cases created by the modeled test case creation unit 1205 between a plurality of components as in the modeled test case comparison and extraction unit 104 of the first embodiment. Then, the modeled test case comparison and extraction unit 1206 extracts differences obtained as a result of comparison, that is, modeled test cases defined for only one component.

Reference numeral 1207 denotes a test case creation unit, which creates test cases by applying interface classification information stored in the interface classification information storage unit 1204 to modeled test cases extracted by the modeled test case comparison and extraction unit 1206.

Figure 13:
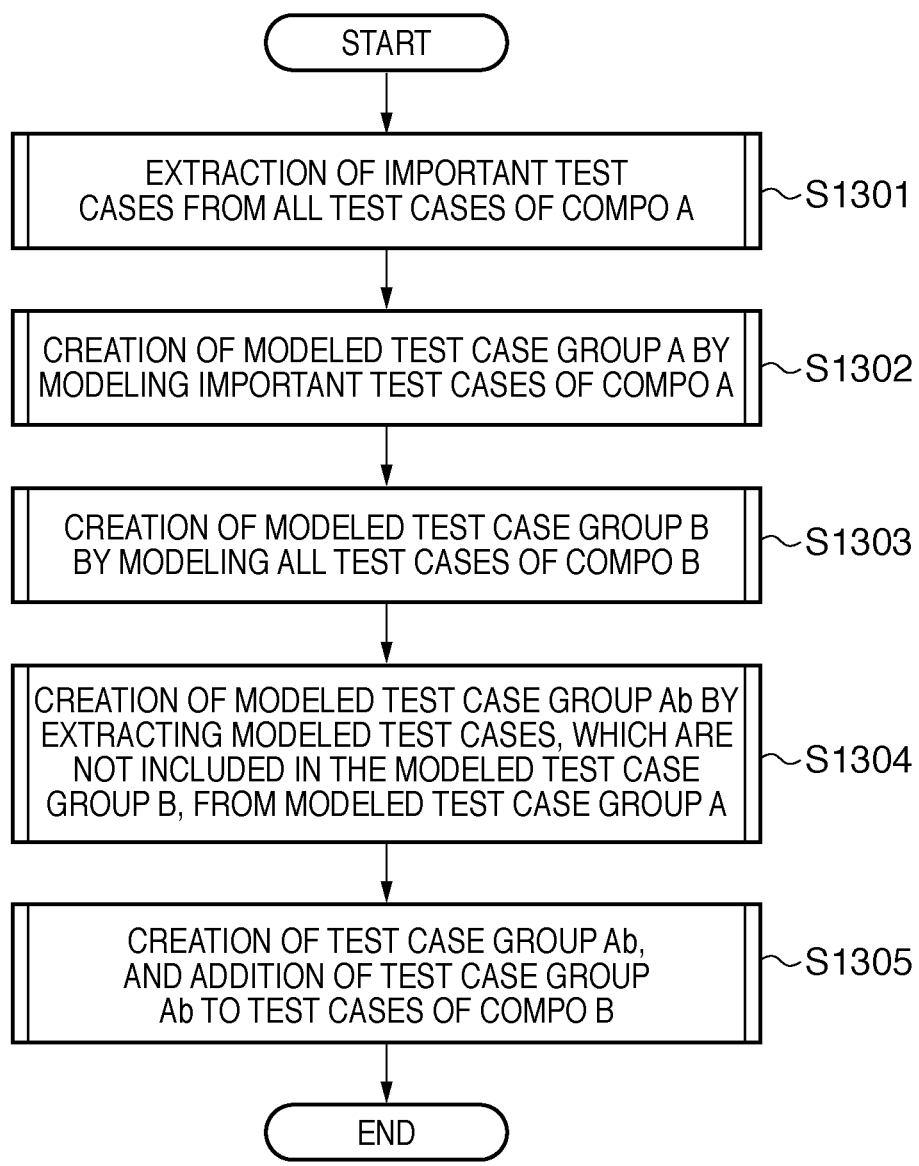
FIG. 13 is a flowchart of a test supporting sequence according to the second embodiment.

FIG. 13 is a flowchart of a component test supporting sequence of the second embodiment. In this case, assume that important test cases of compo A shown in FIG. 2 are added to compo B.

In step S1301, the important test case extraction and storage unit 1203 selects and stores important test cases from test cases stored in the test case storage unit 1201 based on test results stored in the test result storage unit 1202.

In step S1302, the modeled test case creation unit 1205 converts a compo-A important test case group stored in the important test case extraction and storage unit 1203 using compo-A interface classification information stored in the interface classification information storage unit 1204. Thus, the modeled test case creation unit 1205 creates a modeled test case group A. This step S1302 is equivalent to step S901 of the first embodiment.

In step S1303, the modeled test case creation unit 1205 converts a compo-B test case group stored in the test case storage unit 1201 using compo-B interface classification information stored in the interface classification information storage unit 1204. Thus, the modeled test case creation unit 1205 creates a modeled test case group B. This step S1303 is equivalent to step S902 of the first embodiment.

In step S1304, the modeled test case comparison and extraction unit 1206 extracts modeled test cases, which are not included in the created modeled test case group B, from the created modeled test case group A. This step S1304 is equivalent to step S903 of the first embodiment.

In step S1305, the test case creation unit 1207 creates test cases by applying interface classification information stored in the interface classification information storage unit 1204 to the extracted modeled test cases, and adds them to compo B.

Figure 14:
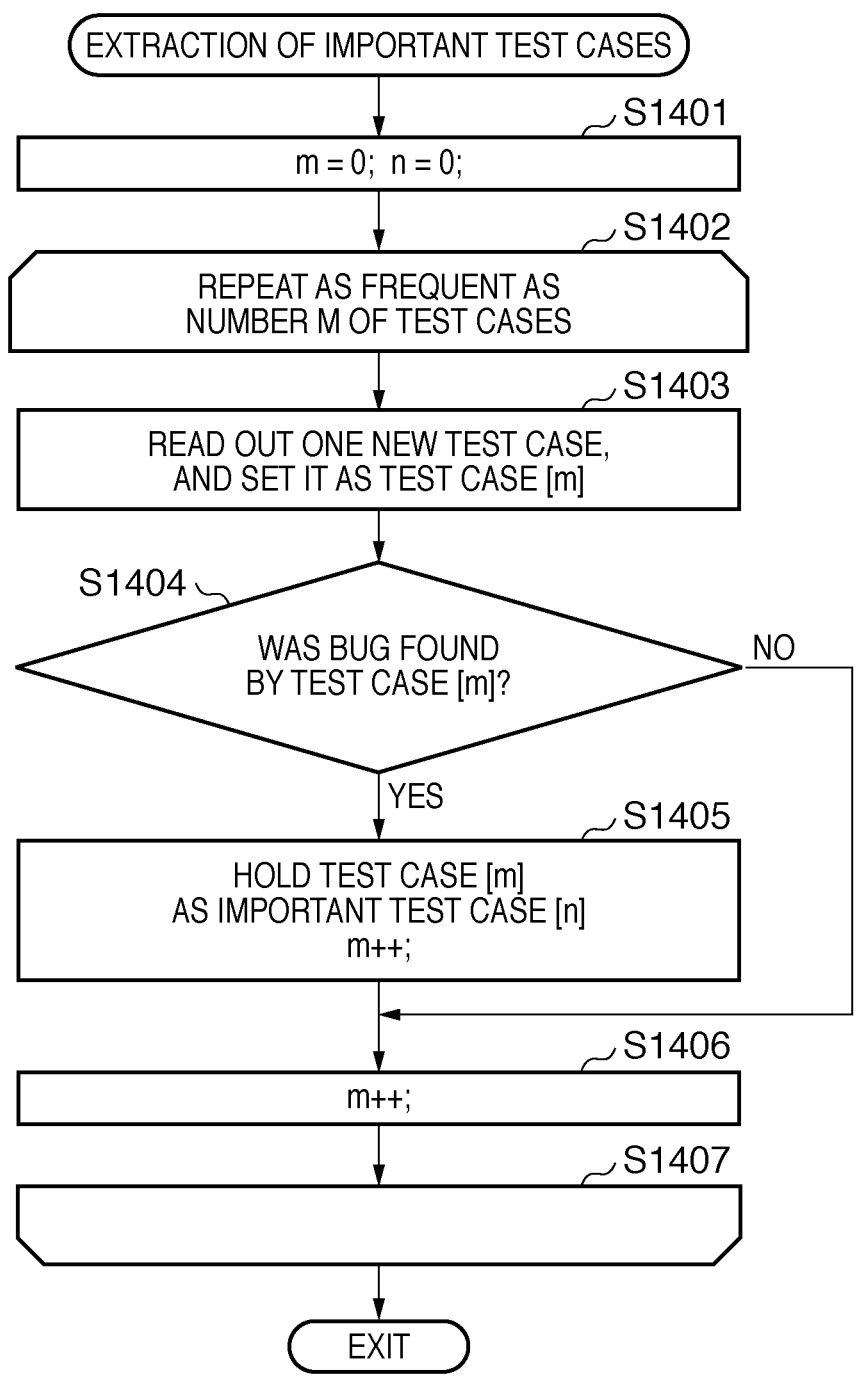
FIG. 14 is a flowchart of an important test case extraction sequence according to the second embodiment.

FIG. 14 is a flowchart showing details of the important test case group extraction sequence by the important test case extraction and storage unit 1203 of the second embodiment. FIG. 14 corresponds to step S1301 in FIG. 13.

In step S1401, the important test case extraction and storage unit 1203 sets "0" in variables m and n as initialization processing (m=0, n=0).

In step S1402, the important test case extraction and storage unit 1203 repeats subsequent processes in steps S1403 to S1407 as frequent as the number M of compo-A test cases stored in the test case storage unit 1201.

In step S1403, the important test case extraction and storage unit 1203 reads out one new test case from the compo-A test cases stored in the test case storage unit 1201, and sets it as a test case [m].

The important test case extraction and storage unit 1203 determines using test result information stored in the test result storage unit 1202 in step S1404 whether or not a bug was found as a result of the test case [m]. If it is determined that a bug was found (YES in step S1404), the process advances to step S1405. On the other hand, if it is determined that no bug was found (NO in step S1404), the process jumps to step S1406.

In step S1405, the important test case extraction and storage unit 1203 holds the test case [m] in which a bug was found as an important test case [n]. Also, the important test case extraction and storage unit 1203 increments the variable n.

In step S1406, the important test case extraction and storage unit 1203 increments the variable m.

As described above, as the execution result of the processes in steps S1401 to S1407, test cases in which bugs were found, that is, important test cases are extracted from the compo-A test cases. In this case, the important test case extraction method can be freely changed according to a system to which the second embodiment is applied, and the second embodiment does not limit the processing contents of the important test case extraction and storage unit 1203.

Figure 15:
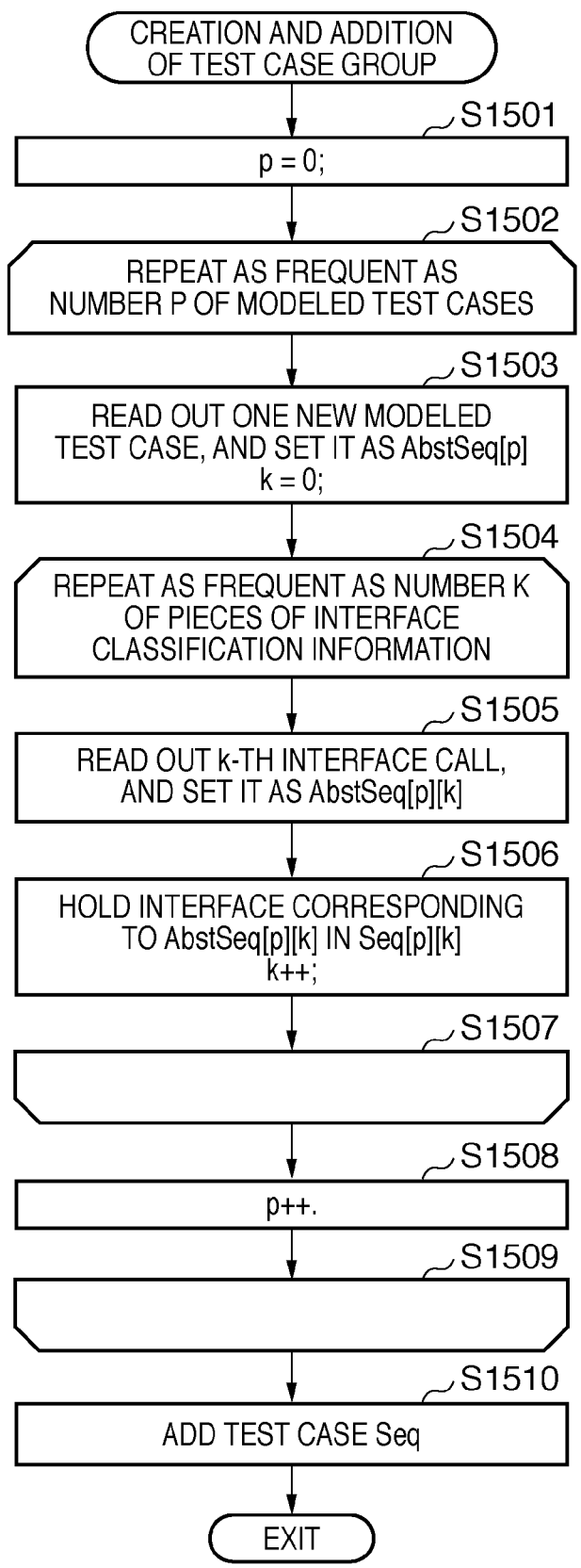
FIG. 15 is a flowchart of a test case group creation and addition sequence according to the second embodiment.

FIG. 15 is a flowchart showing details of the test case group creation and addition sequence by the test case creation unit 1207 of the second embodiment. FIG. 15 corresponds to step S1305 in FIG. 13.

In step S1501, the test case creation unit 1207 sets "0" in a variable p as initialization processing (p=0). In step S1502, the test case creation unit 1207 repeats subsequent processes in steps S1503 to S1509 as frequent as the number p of extracted modeled test cases stored in the modeled test case comparison and extraction unit 1206.

In step S1503, the test case creation unit 1207 reads out one new test case from the modeled test cases stored in the modeled test case comparison and extraction unit 1206, and sets it as AbstSeq[p]. At the same time, the test case creation unit 1207 sets "0" in a variable k as initialization processing (k=0).

In step S1504, the test case creation unit 1207 repeats subsequent processes in steps S1505 to S1507 as frequent as the number K of pieces of interface classification information defined in AbstSeq[p]. In step S1505, the test case creation unit 1207 reads out one interface classification information in turn from the head of AbstSeq[p], and sets it as AbstSeq[p][k].

In step S1506, the test case creation unit 1207 converts the readout interface classification information using interface classification information held in the interface classification information storage unit 1204 into interface calls, and holds them in Seq[p][k]. In this case, as the conversion from a modeled test case into a test case, processing, which is reverse to step S1302 and indicates a process for appending component unique information (interface names and interface configuration) to a modeled test case, is executed. The test case creation unit 1207 increments the variable k.

In step S1508, the test case creation unit 1207 increments the variable p. In step S1510, the test case creation unit 1207 adds test cases Seq accumulated by the processes described so far as test cases of compo B.

As described above, as the execution result of the processes in steps S1501 to S1510, test cases similar to important test cases of compo A are added to compo B.

As described above, according to the second embodiment, when a bug was found in a unit test for compo A, whether or not a similar test has already been conducted for compo B is determined. If such test has not been conducted yet, a test case can be added.

The second embodiment has explained details of the processing taking, as an example, the filter processing components that configure the information processing system shown in FIG. 2. However, this embodiment is applicable to information processing systems of other configurations, and does not limit information processing systems by their configurations.

<Third Embodiment>

The third embodiment of the present invention will be described below focusing on differences from the first embodiment. However, the technical scope of the present invention is not limited by this embodiment.

The arrangement of an information processing apparatus according to the third embodiment is equivalent to that of the information processing apparatus of the first embodiment shown in FIG. 1.

The first embodiment has explained the processing between two components. The third embodiment will explain processing expanded to that among a plurality of components.

Figure 16:
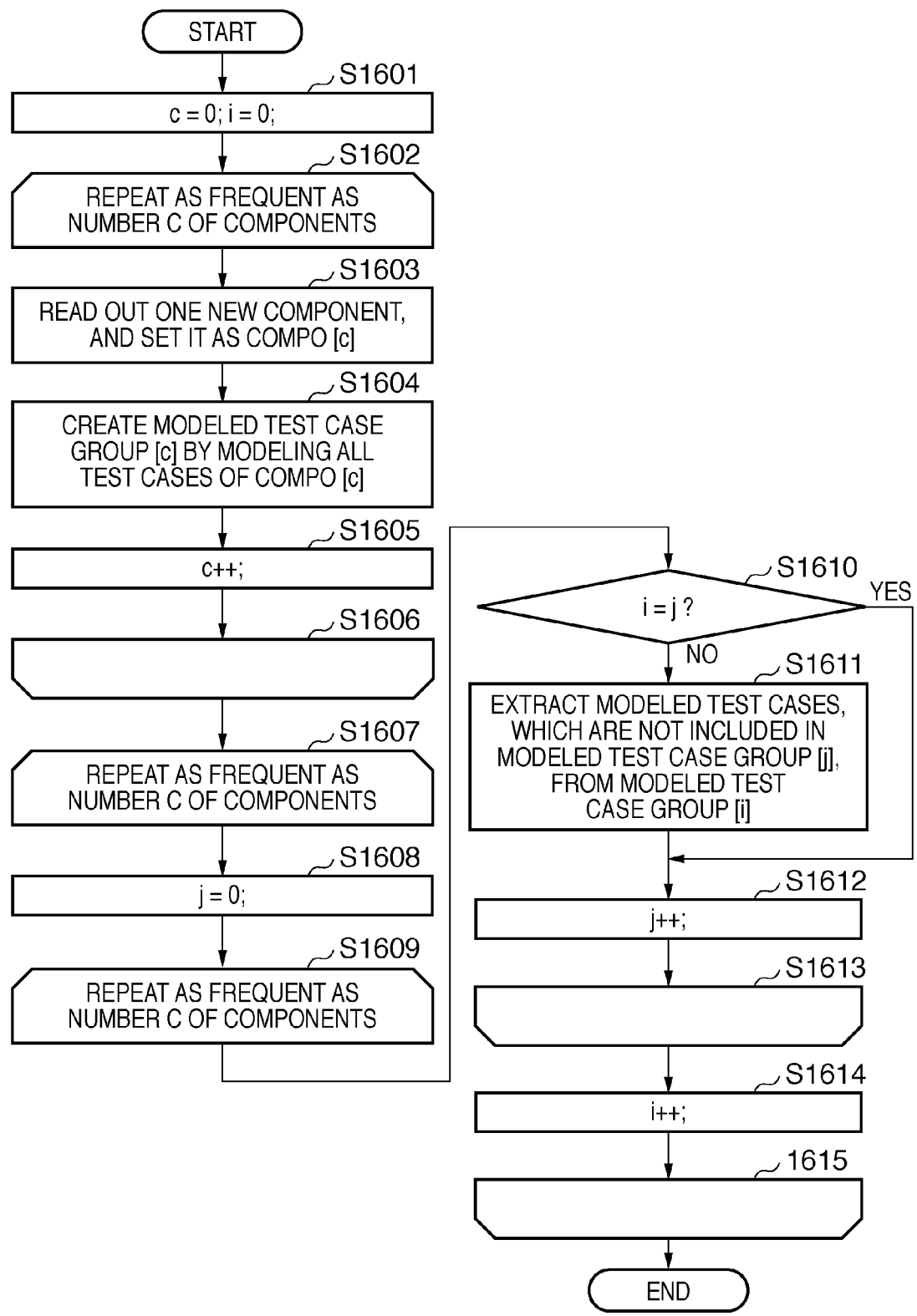
FIG. 16 is a flowchart of a test supporting sequence according to the third embodiment.

FIG. 16 is a flowchart of a component test supporting sequence of the third embodiment.

In step S1601, a modeled test case creation unit 103 sets "0" in variables c and i as initialization processing (c=0, i=0).

In step S1602, the modeled test case creation unit 103 repeats subsequent processes in steps S1603 to S1606 as frequent as the number C of similar components which configure a system.

In step S1603, the modeled test case creation unit 103 reads out one new component from the similar components which configure the system, and sets it as compo [c]. For example, in case of FIG. 2, one component is read out from filter processing components A to N.

In step S1604, the modeled test case creation unit 103 converts a compo-[c] test case group stored in a test case storage unit 101 using compo-[c] interface classification information stored in an interface classification information storage unit 102. This step S1604 is equivalent to steps S901 and S902 of the first embodiment.

In step S1605, the modeled test case creation unit 103 increments the variable c. In step S1607, the modeled test case creation unit 103 repeats subsequent processes in steps S1608 to S1615 as frequent as the number C of similar components which configure the system. In step S1608, the modeled test case creation unit 103 sets "0" in a variable j as initialization processing (j=0).

In step S1609, the modeled test case creation unit 103 repeats subsequent processes in steps S1610 to S1613 as frequent as the number C of similar components which configure the system.

The modeled test case creation unit 103 determines in step S1610 whether or not the variables i and j assume the same value. If the variables i and j assume the same value (YES in step S1610), the process jumps to step S1612. On the other hand, if the variables i and j do not assume the same value (NO in step S1610), the process advances to step S1611.

In step S1611, a modeled test case comparison and extraction unit 104 extracts modeled test cases, which are not included in a compo-[j] modeled test case group, from a compo-[i] modeled test case group stored in the modeled test case creation unit 103. This step S1611 is equivalent to step S903 of the first embodiment.

In step S1612, the modeled test case creation unit 103 increments the variable i. In step S1614, the modeled test case creation unit 103 increments the variable j.

As described above, according to the third embodiment, test cases which are defined for a large number of similar components are converted into modeled test cases, and the converted modeled test cases are compared, thus allowing to compare and extract modeled test cases between arbitrary components.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-128272, filed on Jun. 3, 2010, which is hereby incorporated by reference herein in its entirety.

What is claimed is:

1. An information processing apparatus which, supports, tests of the software components, said apparatus comprising:
   a test case acquiring unit which acquires one or more first test cases which describe first interfaces provided by a first software component for a test of the first software component and acquires one or more second test cases which describe second interfaces provided by a second software component for a test of the second software component;
   a determination unit which determines a classification corresponding to the first interfaces and determines a classification corresponding to the second interfaces;
   a comparison unit which compares the classification corresponding to the first interfaces and the classification corresponding to the second interfaces; and
   an adding unit which adds a test case for the test of the first software component in accordance with a result of the comparison of the classification corresponding to the first interfaces and the classification corresponding to the second interfaces such that a test related to the second interfaces is executed in the test of the first software component.

2. An information processing apparatus which supports tests of software components, said apparatus comprising:
   a test case acquiring unit which acquires one or more first test cases which describe first interfaces provided by a first software component for a test of the first software component and acquires one or more second test cases which describe second interfaces provided by a second software component for a test of the second software component;
   an important test case extraction unit which extracts important test cases in which bugs were found among the first test cases;
   a determination unit which determines a classification corresponding to interfaces of the important test cases and determines a classification corresponding to the second interfaces; and
   an adding unit which adds a test case for the test of the second software component in accordance with a result of a comparison of the classification corresponding to the interfaces of the important test cases and the classification corresponding to the second interfaces such that a test related to the important test cases is executed in the test of the second software component.

3. The apparatus according to claim 1, wherein a first classification corresponds to one of the first interfaces and one of the second interfaces.

4. The apparatus according to claim 1, wherein one or a plurality of pieces of classification correspond to one interface.

5. The apparatus according to claim 1, wherein the classifications corresponding to the first and the second interfaces include pre-processing, post-processing, processing start, processing stop, and parameter setting as different interfaces.

6. The apparatus according to claim 1, wherein when test cases to be compared include identical pieces of classification the test cases are determined to be the same test cases.

7. The apparatus according to claim 1, wherein when test cases to be compared include some identical pieces of classification information, the test cases are determined to be similar test cases.

8. A control method of an information processing apparatus which supports tests of software components, the method comprising:
   a test case acquiring step of acquiring one or more first test cases which describe first interfaces provided by a first software component for a test of the first software component and acquiring one or more second test cases which describe second interfaces provided by a second software component for a test of the second software component;
   a determining step of determining a classification corresponding to the first interfaces and determining a classification corresponding to the second interfaces;
   a comparing step of comparing the classification corresponding to the first interfaces and the classification corresponding to the second interfaces; and
   an adding step of adding a test case for the test of the first software component in accordance with a result of the comparison of the classification corresponding to the first interfaces and the classification corresponding to the second interfaces such that a test related to the second interfaces is executed in the test of the first software component.

9. A control method of an information processing apparatus which supports tests of software components, the method comprising:
   a test case acquiring step of acquiring one or more first test cases which describe first interfaces provided by a first software component for a test of the first software component and acquiring one or more second test cases which describe second interfaces provided by a second software component for a test of the second software component;
   an important test case extracting step of extracting important test cases in which bugs were found among the first test cases;
   a determining step of determining a classification corresponding to interfaces of the important test cases and determining a classification corresponding to the second interfaces; and
   an adding step of adding a test case for the test of the second software component in accordance with a result of a comparison of the classification corresponding to the interfaces of the important test cases and the classification corresponding to the second interfaces such that a test related to the important test cases is executed in the test of the second software component.

10. A non-transitory computer readable storage medium storing a program for causing a computer to control an information processing apparatus which supports tests of software components, the program causing the computer to execute:

a test case acquiring step of acquiring one or more first test cases which describe first interfaces provided by a first software component for a test of the first software component and acquiring one or more second test cases which describe second interfaces provided by a second software component for a test of the second software component;

a determining step of determining a classification corresponding to the first interfaces and determining a classification corresponding to the second interfaces;

a comparing step of comparing the classification corresponding to the first interfaces and the classification corresponding to the second interfaces; and an adding step of adding a test case for the test of the first software component in accordance with a result of the comparison of the classification corresponding to the first interfaces and the classification corresponding to the second interfaces such that a test related to the second interfaces is executed in the test of the first software component.

11. A non-transitory computer readable storage medium storing a program for causing a computer to control an information processing apparatus which supports tests of software components, the program causing the computer to execute:

a test case acquiring step of acquiring one or more first test cases which describe first interfaces provided by a first software component for a test of the first software component and acquiring one or more second test cases which describe second interfaces provided by a second software component for a test of the second software component;

an important test case extracting step of extracting important test cases in which bugs were found among the first test cases;

a determining step of determining a classification corresponding to interfaces of the important test cases and determining a classification corresponding to the second interfaces; and an adding step of adding a test case for the test of the second software component in accordance with a result of a comparison of the classification corresponding to the interfaces of the important test cases and the classification corresponding to the second interfaces such that a test related to the important test cases is executed in the test of the second software component.

12. The method according to claim 8, wherein a first classification corresponds to one of the first interfaces and one of the second interfaces.

13. The method according to claim 8, wherein one or a plurality of pieces of classification correspond to one interface.

14. The method according to claim 8, wherein the classifications respectively corresponding to the first and the second interfaces include pre-processing, post-processing, processing start, processing stop, and parameter setting as different interfaces.

* * * * *